(12) United States Patent
Kenyon (10) Patent No.: US 9,291,463 B2
(45) Date of Patent: Mar. 22, 2016

(54) METHOD OF VERIFYING OR DERIVING ATTRIBUTE INFORMATION OF A DIGITAL TRANSPORT NETWORK DATABASE USING INTERPOLATION AND PROBE TRACES

(75) Inventor: Shaundrea Margaret Newman Kenyon, Grantham, NH (US)

(73) Assignee: TomTom North America, Inc., Lebanon ( * ) Notice: Subject to any disclaimer, the term of this patent is extended or adjusted under 35 U.S.C. 154(b) by 946 days.

(21) Appl. No.: 13/388,730

(22) PCT Filed: Dec. 31, 2009

(86) PCT No.: PCT/US2009/069945
§ 371 (c)(1),
(2), (4) Date: Jun. 11, 2012

(87) PCT Pub. No.: WO2011/016819
PCT Pub. Date: Feb. 10, 2011

(65) Prior Publication Data
US 2012/0246192 A1 Sep. 27, 2012

Related U.S. Application Data (60) Provisional application No. 61/273,185, filed on Aug. 3, 2009.

(51) Int. Cl.
*G06F 17/30* (2006.01)
*G01C 21/32* (2006.01)
*G06F 11/00* (2006.01)
*G06F 11/34* (2006.01)

(52) U.S. Cl.
CPC ............. *G01C 21/32* (2013.01); *G06F 11/00* (2013.01); *G06F 11/3466* (2013.01)

(58) Field of Classification Search
CPC G06F 11/00; G06F 11/3466; G06F 17/30241
See application file for complete search history.

(56) References Cited

U.S. PATENT DOCUMENTS

| | | | |
|---|---|---|---|
| 6,385,533 B1 | 5/2002 | Halt et al. | |
| 7,747,381 B2 * | 6/2010 | Adachi | 701/118 |
| 7,957,893 B2 * | 6/2011 | Smartt | 701/450 |
| 2002/0026278 A1 | 2/2002 | Feldman et al. | |
| 2006/0111837 A1 | 5/2006 | Tauchi | |

(Continued)

FOREIGN PATENT DOCUMENTS

EP          0921509 A2    6/1999

OTHER PUBLICATIONS

International Search Report issued Jan. 27, 2010 for International Application No. PCT/US2009/069945.

*Primary Examiner* — Dinku Gebresenbet (57) ABSTRACT

A method of verifying or filling in attribution associated with segments of transportation networks that are digitally mapped from a digital transportation network database includes analyzing the database to identify at least one attribute of interest that is missing or whose accuracy is unreliable and associated with a segment of the network in; identifying first and second segments before and after segment in question which have associated attribution determined to be accurate; gathering a plurality of probe traces from users of probe-transmitting navigation devices that have traversed the segment(s) in question as well as traversed the first and second; and determining whether the probe-derived attribution information is reliable, and if so, comparing the trend of the probe-derived attribute information of the first and second segments with the trend of the database attributes of the first and second segments, and if there is a positive correlation, applying the probe-derived attribute information to the database for the segment(s) in question to fill in the missing or verify the unreliable database attribution for the segment(s) in question.

12 Claims, 7 Drawing Sheets

(56) References Cited

U.S. PATENT DOCUMENTS

| | | | |
|---|---|---|---|
| 2007/0208493 A1* | 9/2007 | Downs et al. ............ 701/117 |
| 2009/0070031 A1* | 3/2009 | Ginsberg ............ 701/208 |
| 2009/0138497 A1 | 5/2009 | Zavoli et al. |
| 2009/0169055 A1 | 7/2009 | Ishikawa |

* cited by examiner

METHOD OF VERIFYING OR DERIVING ATTRIBUTE INFORMATION OF A DIGITAL TRANSPORT NETWORK DATABASE USING INTERPOLATION AND PROBE TRACES

CROSS REFERENCE TO RELATED APPLICATIONS

This application is the National Stage of International Application No. PCT/US2009/069945, filed Dec. 31, 2009 and designating the United States. The entire contents of this application is incorporated herein by reference. This application claims priority to U.S. Provisional Application 61/273,185 entitled "Method to create a digital transportation network" with a priority date of Aug. 3, 2009. The entire content of this application is incorporated by reference.

STATEMENT OF COPYRIGHTED MATERIAL

A portion of the disclosure of this patent document contains material which is subject to copyright protection. The copyright owner has no objection to the facsimile reproduction by anyone of the patent document or the patent disclosure, as it appears in the PTO patent file or records, but otherwise reserves all copyright rights whatsoever.

BACKGROUND OF THE INVENTION

1. Field of the Invention

This invention relates generally to digital transportation networks used in GIS (geographic information system) and navigation applications containing attribute information which describe properties of a point, segment or area of a digital geographic navigation map. More particularly, this invention relates to methods for verifying questionable attributes or filling in missing attributes along segments of a roadway in a digital mapping database.

2. Related Art

Figure 1:
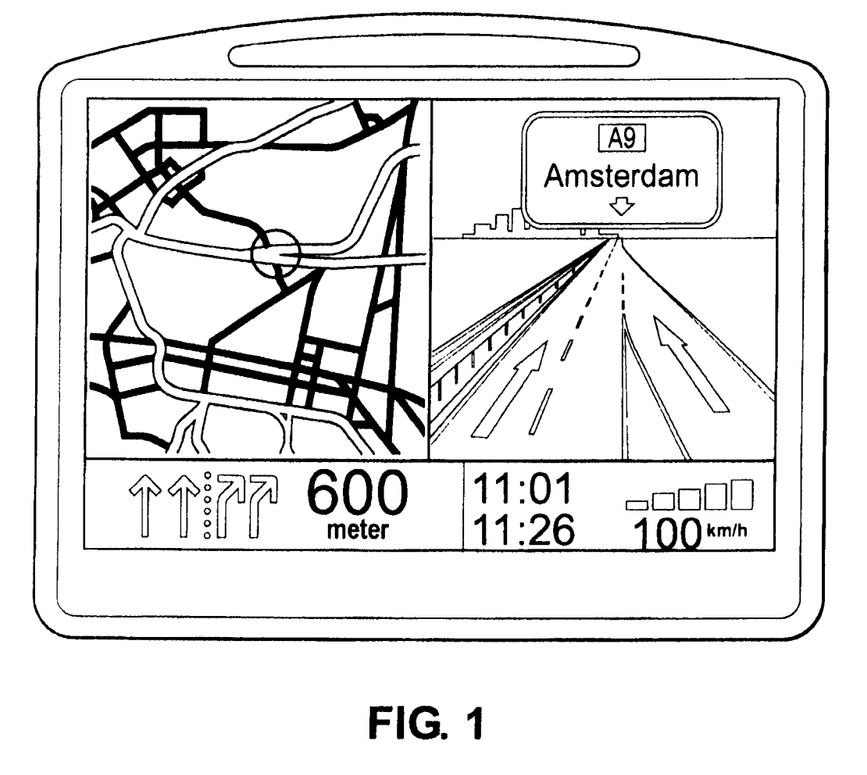
FIG. 1 is an exemplary view of a personal navigation device including a display screen for presenting map data information to a vehicle driver.

Personal navigation devices like that shown for example in FIG. 1 utilize digital maps combined with accurate positioning data from GPS or other data streams. These devices have been developed for commuters seeking navigation assistance, for businesses trying to minimize transportation costs, and many other applications. The effectiveness of such navigation systems are inherently dependent upon the accuracy and completeness of the information provided to it in the form of digital maps and associated attribute data. Likewise, the effectiveness of such navigation systems is also dependent upon accurately and quickly matching the actual, real-world location of the navigation device to a corresponding portion of the digital map. Typically, the navigation system includes a small display screen or graphic user interface that portrays a network of streets as a series of line segments, including a center line running approximately along the center of each street or path, as exemplified in FIG. 1. The traveler can then be generally located on the digital map close to or with regard to that center line. Such GPS-enabled personal navigation devices, such as those manufactured by TomTom N.V. (www.tomtom.com) may be also configured with probe transmitters to generate probe data points. Of course, other suitable devices may be used to generate probe data points including handheld devices, mobile phones, PDAs, and the like.

Digital maps are expensive to produce and update, since exhibiting and processing road information is very costly. Surveying methods or digitizing satellite images have been employed in the past for creating digital maps, but are prone to the introduction of inaccuracies or systematic errors due to faulty or inaccurate input sources or flawed inference procedures. Once a digital map has been created, it is costly to keep map information up to date, since road geometry changes over time.

Figure 2:
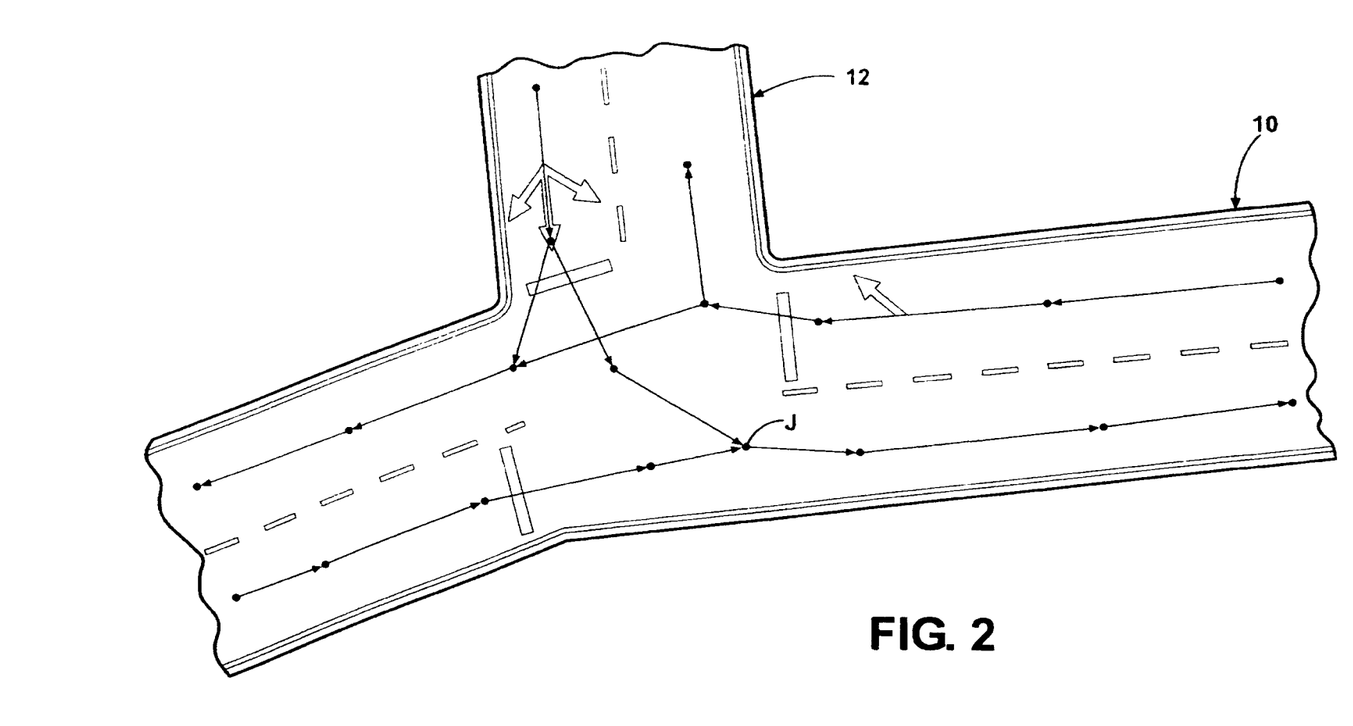
FIG. 2 is a fragmentary view of several transportation segments as presented in a digital map and associated with a roadway in real life.

FIG. 2 illustrates a fractional section of a digital map, in this case a by-directional roadway supporting two-way traffic. A main trunk of the roadway is indicated at 10 and a branch road extending generally perpendicularly from the main trunk 10 is indicated at 12.

It is known, for example, to take probe data inputs from low-cost positioning systems and handheld devices and mobile phones with integrated GPS functionality for the purpose of incrementally learning a map using certain clustering technologies. The input to be processed consists of recorded GPS traces in the form of a standard ASCII stream, which is supported by almost all existing GPS devices. The output is a road map in the form of a directed graph with nodes and edges associated with travel time information. Travelers appropriately fitted with navigation devices may thus produce a trace map in the form of probe data, with nodes created at regular distances. The nodes and edges are stored in a digital map table or database. Through this technique, road geometry can be inferred and the collected probe data points refined by filtering and partitioning algorithms. For a more complete discussion of this technique, reference is made to "Incremental Map Generation with GPS Traces," Briintrup, R., Edelkamp, S., Jabbar, S., Scholz, B., Proc. $8^{th}$ Int. IEEE Conf. on Intelligent Transportation Systems, Vienna, Austria, 2005, pages 413-418.

Figure 3:
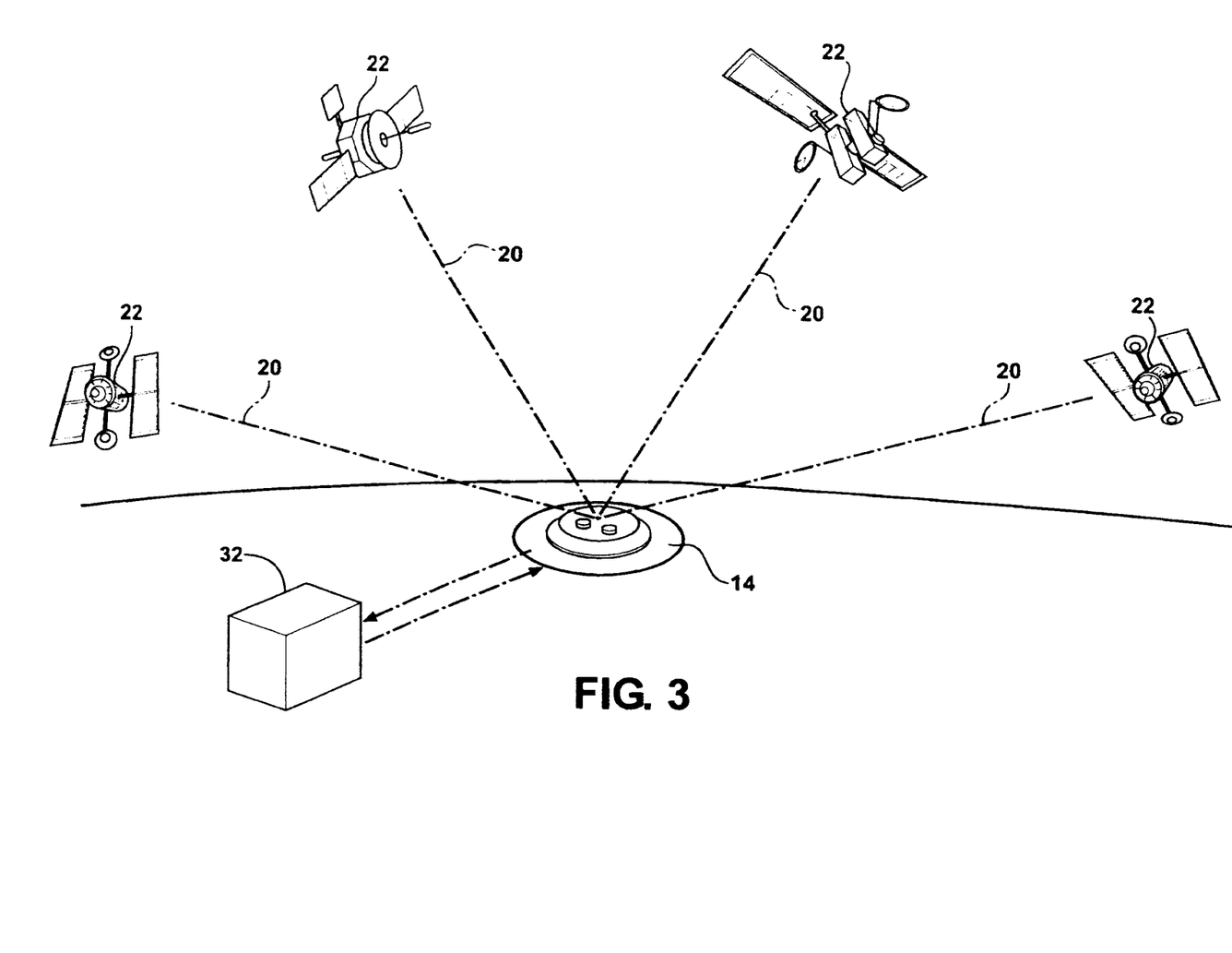
FIG. 3 shows in simplified terms a geometric configuration of GPS satellites whose radio signals are received by a particular GPS antenna and which further communicate with a digital transportation network database system processor to send, receive and process information.

One issue associated with such methods for generating and updating digital maps using probe data relates to certain accuracy issues associated with GPS measurements. As is well known, GPS is based on concepts of satellite ranging, wherein the distances between the GPS receiver and four or more satellites are calculated, as represented illustratively in FIG. 3. Assuming the positions of the satellites 22 are known, the location of the receiver 14 can be calculated by determining the distance from each satellite 22 to the receiver 14. Distance measurements are determined by measuring the amount of time it takes the GPS radio signal 20 to travel from the satellite 22 to the receiver 14. Radio waves travel at the speed of light. Therefore, if the amount of time it takes for the GPS signal to travel from the satellite 22 to the receiver 14 is known, the distance (distance=speed×time) can be determined. Thus, if the exact time when the signal 20 was transmitted and the exact time when it was received or known, the signal's travel time can be easily calculated.

Figure 4:
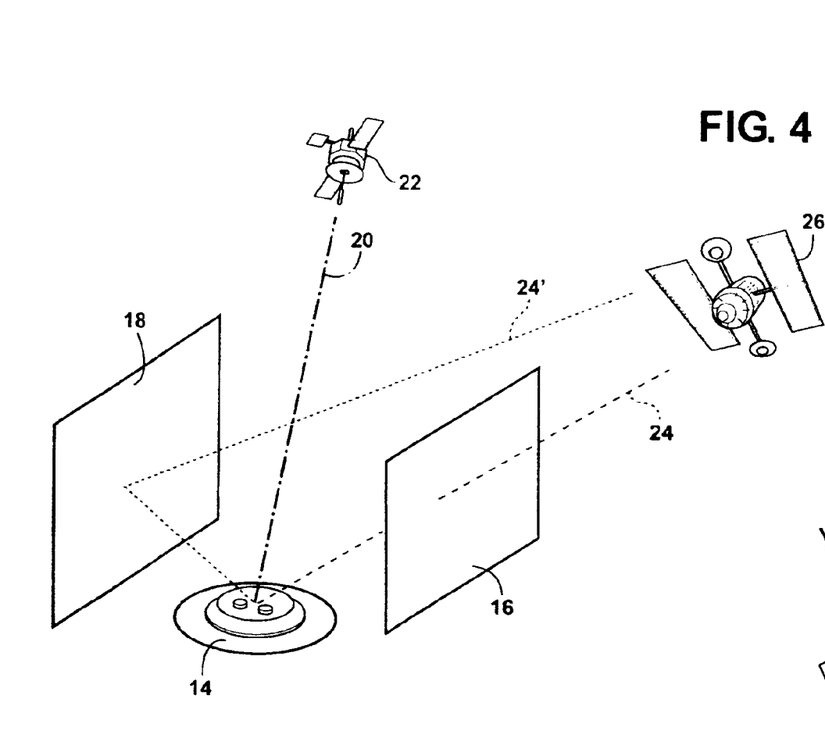
FIG. 4 is a simplified view of a GPS antenna located between two obstacles which affect the proper reception of a GPS signal from one of the satellites and thereby cause corruption of an incoming GPS signal according to the well known "urban canyon" multi-path error.

GPS systems are designed to be as nearly accurate as possible, however various factors are known to introduce errors. Added together, these errors cause deviations in the calculated position of the GPS receiver. Several sources for errors are known, some of which include: atmospheric conditions, ephemeris errors, clock drift, measurement noise, selective availability and multi-path. Multi-path error, also know as "urban canyon" error is a serious concern for GPS users. Urban canyon error is caused by a GPS signal 20 bouncing off of a reflective surface prior to reaching the GPS receiver antenna 14. It is difficult to completely correct urban canyon error, even in high precision GPS units. FIG. 4 is a schematic view describing the urban canyon phenomenon. A GPS antenna 14 is stationed between first 16 and second 18 obstacles, which may, for example, represent tall buildings in a city center environment. A GPS signal 20 from one GPS satellite 22 is received without corruption, however a signal 24 from another satellite 26 encounters the first obstacle 16 so that its signal 24 does not proceed directly to the GPS antenna 14. A corrupt signal 24' from the satellite 26, however, is reflected off the second obstacle 18 and received by the GPS antenna 14. Reflection of the corrupted signal 24' results in a situation where it takes longer for the signal 24' to reach the GPS antenna 14 than it should have. This time lag results in a perceived position shift of the GPS antenna 14 from its actual position in real life.

Figure 5:
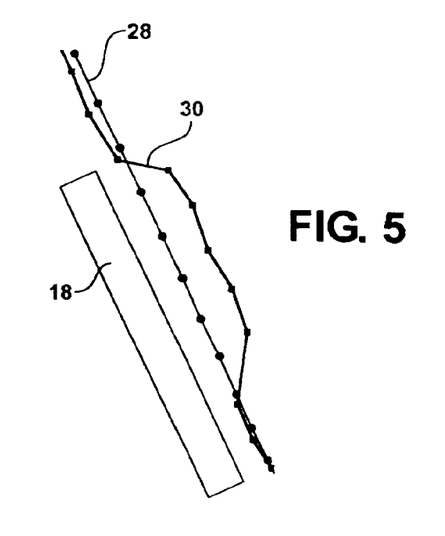
FIG. 5 depicts a simulated representation of a GPS trace data from the antenna of FIG. 4 mapped in a digital map, wherein a GPS urban canyon results in a calculated position of a roadway which does not accurately track the true position in real life.

FIG. 5 shows a sample trace path from probe data created by a personal navigation device utilizing the antenna 14. The real, actual position of the moving probe transmitter is represented by the straight line 28 and the calculated position of the GPS antenna 14 is represented by the path 30. As shown, the calculated position of the GPS antenna 14 demonstrates corruption due to the effects of urban canyon lead to gaps or poor quality attribution of segments of the transportation network.

Digital maps can also be derived from satellite imagery, wherein images of roadway networks are digitized and then matched or overlaid with other attribute data to form a digitized transportation network usable by the various navigation devices. However, a similar urban canyon effect can occur when segments of the transportation network are blocked from view, such as from dense tree cover or the like. In such case, attribute information concerning the blocked segments can be all together missing or their accuracy in question or corrupt.

Consequently, digital transportation networks of various types and derived in various ways have numerous segments where there are gaps in attribution such as average speed, posted speed limits, one-way direction indications or position of centerline, among other attributes. This lack of attributes (missing or unreliable) may be a result of drop-outs in the source material that went into making the attribution in the first place, as described above. In a further example, the attribute may be attached to a roadway segment, but one cannot verify its accuracy or precision because the sensor, imagery or other maps from which the attributes are derived cannot themselves be verified as to accuracy. Consequently, metadata associated with accuracy for the given attribute in question would be lower than for surrounding roadway segments where the attribute data does exist and can be verified.

For navigation and other digital mapping systems that rely on extreme accuracy of the attribute information in the database, roadways having segments with missing or poor quality attribute information would be noticed by users of navigation devices, and the software of such devices may also preferentially select alternative routing around these problem segments due to the lack of confidence or absence (gaps) of the attribute information along the affected roadway segments.

To resolve these gaps or inaccuracies of attributes in the database, it is current practice to acquire another source of information to verify the attribution and/or to dispatch field staff to the problem roadway segments in order to ground truth the attributes in question. Both approaches are recognized as being time consuming and costly, but nonetheless presently necessary in order to achieve the desired result of accurate attribution.

It is an object of the present invention to provide a means of filling in attribution information when it is missing, and/or verifying and updating, if necessary, the metadata associated with attribution information to provide high accuracy and precision of attribution for digital transportation roadway network databases, and to do so in a quick, orderly and cost-effective manner.

SUMMARY OF THE INVENTION AND ADVANTAGES

These and other objects and advantages are achieved according to one aspect of the invention by a method of verifying or filling in attribution associated with segments of roadways that are digitally mapped from a digital transportation network database. The method comprises analyzing the database to identify at least one attribute of interest that is missing or whose accuracy is unreliable and further identifying a segment in question of the roadway with which the attribute of interest is associated; further analyzing the database to identify a first segment of the roadway and a second segment of the roadway, wherein the first segment immediately preceding and connected to a front end of the segment(s) in question and the second segment immediately succeeding and connected to a back end of the segment(s) in question, and further wherein the first and second segments have associated attribution of interest that is determined to be accurate; gathering a plurality of probe traces from users of probe-transmitting personal navigation devices that have traversed the roadway segment in question as well as traversed the first and second segments on either side of the segment(s) in question, wherein the probe traces include probe-derived attribute information; and determining whether the probe-derived attribution information is reliable, and if so, comparing the trend of the probe-derived attribute information of the first and second segments with the trend of the database attributes of the first and second segments, and if there is a positive correlation, applying the probe-derived attribute information to the database for the segment(s) in question to fill in the missing or verify the unreliable database attribution for the segment(s) in question.

The invention further provides a method of verifying or filling in attribute information of a digital transportation network database, comprising: identifying at least one attribute of interest in the database that is either missing or unreliable and matching the attribute of interest with a segment of a roadway in question having associated therewith a first roadway segment immediately preceding the segment(s) in question and whose database attribution is deemed reliable and further associated therewith a second roadway segment immediately succeeding the segment(s) in question and whose database attribution is also deemed to be reliable, and wherein the first and second segments and the segment(s) in question are all part of an extended section of a common roadway; reporting data from a plurality of probe transmitters tracking across both of the first and second road segments and also across the segment(s) in question, the reported data including attribute information; and comparing the probe-derived attribute information of the first and second road segments with the attributes stored in the database for the first and second segments and if there is a positive correlation, updating the database by assigning the probe-derived attribute information to the database for the segment(s) in question.

The invention thus has the advantage of utilizing probe traces from a plurality of users of navigation devices that traverse the problem roadway segment with missing or potentially poor attribution and that also traverse connected adjacent roadway segments with good attribution on either end of the problem segment in question. This probe data, once analyzed and statistically manipulated, may be interpolated to fill in the gaps in missing or corrupt attribution of the database in these problem segments.

An example of such an attribute is the posted speed of a roadway across the segment(s) in question. The database may show the posted speed of the connected adjacent segments to be the same (e.g., 100 km/hr) but the posted speed in the problem segment to be missing or unreliable. One cannot simply assume, without more, that the posted speed across the problem segment is the same as the posted speed of the connected segments. However, the probe data of users of navigation devices traversing the problem and connected segments can be analyzed and, if found to be generally uniform, can allow one to safely assign the missing or potentially poor attribution the same value as the attribution of the connected segments (e.g., 100 km/hr). If the probe data reveals the speed to be variable across the segments (e.g., the vehicles slow down through the problem segment), then one can also safely assume that the posted speed is different and can either interpolate the value based on the comparative probe data, or use an alternative means of learning the value of the attribution in the problem area (e.g., dispatch field personnel).

The invention thus has the advantage of resolving missing or questionable attribution based on interpolation of existing attribution data in combination with probe data to reduce and possibly eliminate the need for field personnel to be physically dispatched to problem transportation segments.

Other candidate attribution information that can be verified or sourced according to the invention includes, but is not limited to: one-way road direction indications; speeds (average, posted, time-of-day), centerline location and/or positional accuracy, and traffic controls (stop signs and traffic lights).

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Referring to the Figures, wherein like numerals indicate like or corresponding parts throughout the several views, this invention pertains to digital transportation network navigation systems and to the digital maps, databases and devices used by navigation systems. By "digital transportation network", it is meant to include digital mapping systems for various established transportation networks, including various roadway surfaces for motorized and non-motorized vehicles, walking, biking, skiing and hiking trails, and other established routes along which users of navigations devices travel for business or pleasure. For purposes of this invention, the term "roadway" is intended to be used in a most general way and to be inclusive of all paved and unpaved roads, paths, trails and the like for use by any type of vehicle or by a pedestrian.

This invention is applicable to correcting/updating databases of transportation networks involved with all kinds of digital navigation devices including, but not limited to, handheld navigation devices, personal navigation devices, PDAs, mobile telephones with navigation software, in-car navigation systems built in a vehicle and personal computers. The invention can be implemented in connection with any type of standard navigation device available on the market, as well as suitable systems which may be developed in the future.

Considering personal navigation devices as an example, like shown in FIG. 1, such devices generally comprise a determination device which may include a GPS (global positioning system) or other GNSS (global navigation satellite system) unit connected to an antenna 14 and arranged to communicate with a plurality of satellites 22, 26 so as to calculate a position from signals 20, 24 received from the satellites 22, 26. The navigation system may also deliver heading data (i.e., direction of travel) and speed of the vehicle in which it is transported. The GPS system may be a DGPS system (differential GPS) or one augmented by WAAS (wide area augmentation system) providing an accuracy of, for example, one sigma/one meter (apart from possible white noise). The GPS systems of this type are typically connected to a microprocessor and arranged to process the GPS output signals 20 as previously described.

Based on the signals received from the GPS system, the microprocessor determines suitable display signals to be displayed on a display device like that shown in FIG. 1 as to inform the driver where the vehicle is located relative a road network like that shown in FIG. 2, and possibly in what direction the vehicle is traveling. Moreover, in the context of the present invention, the microprocessor may be programmed to provisionally match the mobile navigation device to a particular road segment in a digital map and then to make an assessment whether the provisional match is reliable. If not reliable, the system may rely on other techniques to determine the position of the mobile navigation device, such as an auxiliary inertial guidance system for example. Such inertial guidance systems may also include other position determination features such as a DMI (distance measurement instrument) which is a form of odometer for measuring the distance traveled by the vehicle through the number of rotations of one or more wheels. Inertial measurement units (IMUS) may be implemented with several gyro units arranged to measure rotational accelerations, together with suitable accelerometers arranged to measure translational accelerations. The processor inside the navigation system may be further connected to a receiver of broadcast information or a digital communication network (e.g., radio RDS, DAB) or cellular GPRS/EDGE/UMTS network.

A microprocessor of the type provided with the digital transportation network system according to this invention may comprise a processor 32 carrying out arithmetic operations. The processor is usually connected to a plurality of memory components including a hard disk, read only memory, electrically erasable programmable read only memory, and random access memory. However, not all of these memory types need necessarily be provided. The processor is typically connected to a feature for inputting instructions, data, etc. by a user in the form of a keyboard, touch screen and/or voice converter.

The processor 32 may further be connected to a communication network via a wireless connection, for instance the public switched telephone network (PSTN), a local area network (LAN), a wide area network (WAN), the internet, etc. by means of an input/output (I/O) device. In this mode, the processor may be arranged to communicate as a transmitter with other communication arrangements through the network. Through this arrangement, a navigation device can function as a probe transmitter relaying its determined position as computed from signals 20, 24 received from the satellites 22, 26.

When a digital map provider receives large quantities of probe data, also known as GPS traces, probe data, GPS data and the like, substantial computing resources are required to process the data and mine it for useful information.

According to one aspect of the present invention, the database associated with a selected transportation network is first analyzed to find any roadway segments where attribution is either missing or has metadata indicating a lack of confidence in the value of the attribute. These segments are designated as "segments in question" 34 and the task is to utilize probe data collected from users of various navigation devices that traverse the transportation network system in order to fill in or verify the "attribute of interest" 36 associated with the segments in question. Identification of the segments in question 34 can be carried out by querying the database for null or void fields (for the given attribute) or for confidence codes or metadata values that indicate poor confidence in individual attributes. This much is know and will be understood by those skilled in the art without further explanation.

Figure 6:
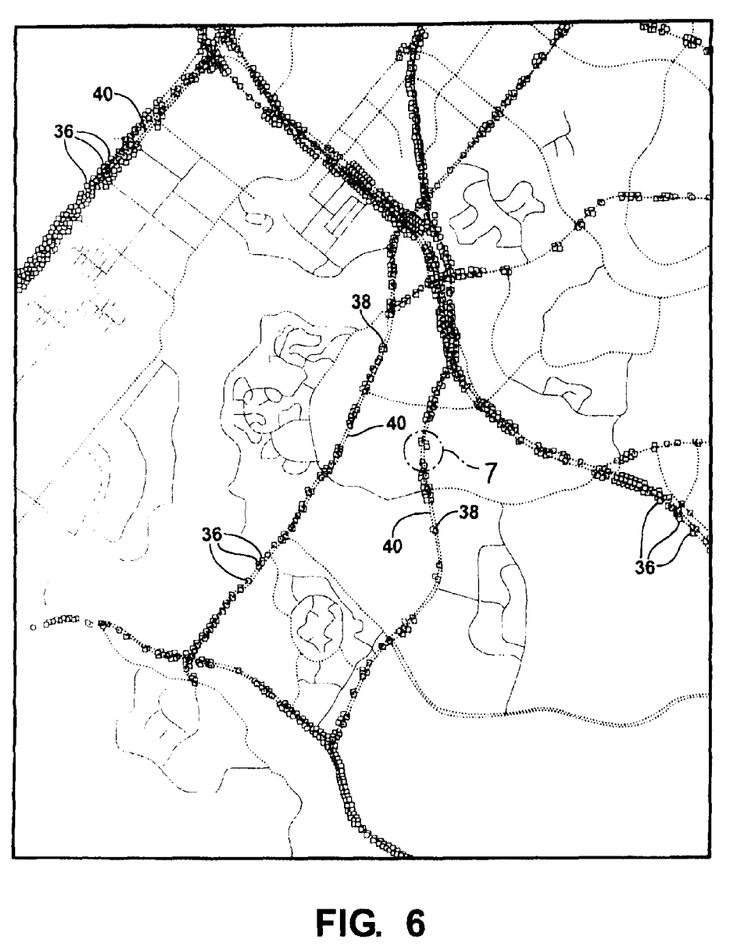
FIG. 6 a schematic of a digital transportation network illustrating gaps of attribution in the database which are either missing or are deemed unreliable, together with overlying probe trace information gathered from numerous navigation devices traveling the transportation network.

FIG. 6 illustrates a digital transportation network which is representative of a roadway system (keeping in mind that the invention is not limited to roadways for motorized vehicles, but is equally applicable to all transportation networks). Shown are a series of data points 36 that are representative of an attribution (such as posted speed limit) stored in the database and associated with the digital transportation network at various segments of the transportation network. A segment, for purposes of this invention is defined as a stretch or section of roadway an any designated length, and the network is made up of a chain of segments that are "connected" to one another, such that a given segment will have a segment preceding it and one following it in a smooth, seamless fashion. The segments may be dived by, for example, city blocks, or may be longer or shorter than a city block. The segments do not have to be of equal length, such that a middle segment may be longer or shorter than the segments that precede and/or follow it. It will be seen in FIG. 6 that there are sections of the roadway where the database attribution is dense and well connected from segment to segment, but there are other sections where the database attribution information is either missing or sparse, such that there are gaps 38 of attribution in the original data which may have been gathered by a mobile mapping vehicle, or the like.

Overlaid on top of the database attribution points 36 in FIG. 6 are a plurality of probe traces 40 gathered from users of the various navigation devices 14 which transmit probe data. The attribution points 36 of the database are represented as open boxes, whereas the probe traces 40 are represented by dotted lines. The probe data associated with the probe traces 40 in this particular example may include "average speed" of the vehicles that travel along the numerous segments of the transportation network. For a given attribute (e.g., posted speed limit) as many good probe traces (average speed) as can be found are collected along the segments in question 34, as well as the associated "first" segment 44 immediately preceding the segment(s) in question 34, and the "second" segment 46 that immediately follows the segment(s) in question 34. A good probe trace 40 is one whose attribution is known to be good at least in the first 44 and second 46 segments immediately before and after the segment(s) in question 34, and preferably but not necessarily possessing good attribution in the segment(s) in question 34, as will be explained further below.

Figure 7:
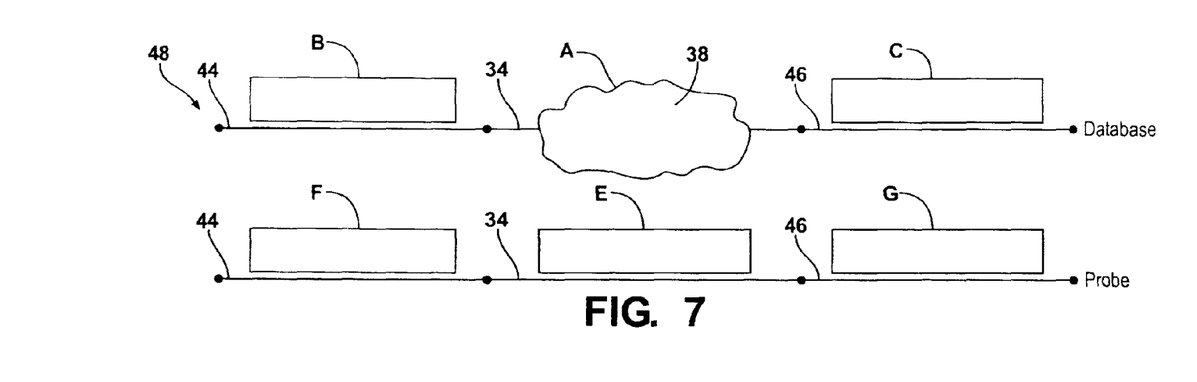
FIG. 7 is a schematic drawing of a section of the digital transportation network having successive segments with associated database and probe trace information.

FIG. 7 illustrates a simplified exemplary section of the roadway 48 that is circled in FIG. 6. It is understood that FIG. 7 is for illustrative purposes only and that it could just as well represent any of a number of sections along the digital transportation network system illustrated in FIG. 6 for which there is gaps in attribution in segments of the roadway sandwiched between segments with know attribution, and for which interpolation of probe trace data can be used to close the gaps. The section 48 is shown having the "segment in question" 34 with its associated "attribute of interest" A of the database, which is either missing or whose value if in doubt. The segment of interest is bordered one side by the "first" segment 44 having known attribute B from the data base and bordered on the opposite side by "second" segment 46 having known attribute C from the database. The same section 48 of the roadway is shown at the bottom of FIG. 7 associated with the collection of probe data gathered from a plurality of navigation devices that have traversed segments 44, 34 and 46 in succession, and have provided associated probe values of E, F and G, respectively.

The probe traces over the length of the respective segments 44, 34, 46 of FIG. 7 are statistically averaged to determine an adjusted mean trace value for each segment. In general, any attribute that can be derived from or relate to probe measurement via statistical means can be used to fill gaps in attribute coverage of an existing transportation network database, or to verify the accuracy of the existing attribute. Once the mean trace values are calculated, one can derive the value of the attribute of interest or the value of an indicator that can be statistically related to the attribute of interest from the mean probe trace at intervals along the probe trace, or one can determine a function that predicts the value of the attribute or indicator along the probe trace. Average speed derived from probe data is an indicator of posted speed along the trace path, as an example, and they are tied together by a known function. This speed example will be developed further below. The process involves looking at the trend of attributes from the sequence of database attributes B, C before and after the segment(s) of interest 34, and comparing these to the calculated attribute or indicator from the same segments along the probe trace. If the trends are similar (i.e., comparison of centerline), and there is positive correlation, one can apply the calculated attribute from the probe trace data to the segment(s) of interest in the database. If a function was calculated, apply the average value of the function over the probe trace length that is coincident with the segment(s) of interest to the segment. If an indicator was used, apply the value of the function proportionate to the ratio.

Figure 8:
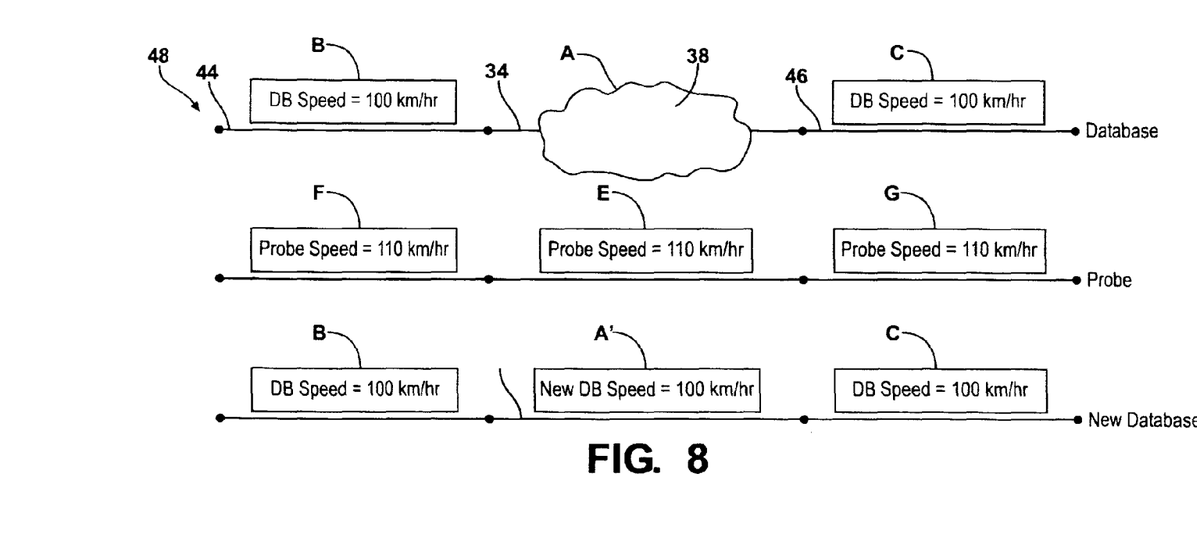
FIG. 8 is a schematic similar to FIG. 7 showing attribute information associated with the segments and derived in part by probe trace information.

FIG. 8 is an example involving the determination of a speed limit as the missing or doubtful attribute A of the segment(s) in question 34. In this example, it is known with certainty that the posted speed limit is 100 km/hr in the first and second segments 44, 46 immediately before and after the segment(s) in question 34. The question is whether the speed limit is also 100 km/hr across the segment(s) in question. The probe data along the same trace path shows an average speed of 110 km/hr across the first and second segments 44, 46 and also across the segment(s) in question 34. An assumption is made that the average speed calculation from the mean trace on either side of the segment(s) in question 34 will be proportional to the posted speed limit on the segments prior to and after the segment(s) in question. The average speed is assumed to be proportional rather than equivalent to the posted speed, since most people do not drive the posted speed limit, and are either speeding or are caught in traffic congestion. If the ratio of the speed limit to average mean trace speed is near the same and within an acceptable predetermined tolerance, then it can be further inferred that the speed limit on the segment(s) in question will be proportional to the average mean speed for the probe trace over the length of the segment in question. In this example, it can be determined from the consistent probe data across the trace path of the segments that the "new" posted speed limit A' attribution of the database on the segment(s) in question 34 is 100 km/hr, allowing this gap 38 in the database to be closed. The same approach can be used to close other gaps in attribution where the same relationships in the database attribution versus probe data exist so as to populate the database with new attribution where needed and without having to resort to dispatching field staff to the segments in question.

Figure 9:
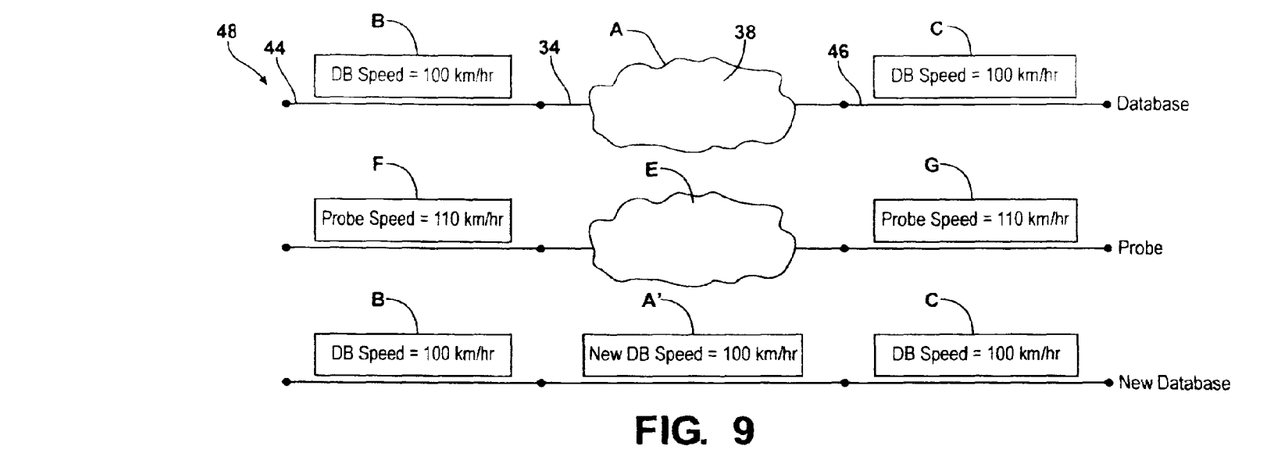
FIG. 9 is a schematic similar to FIG. 7 showing attribute information associated with the segments and also derived in part by probe trace information.

However, as illustrated in FIG. 9, it is also possible that the probe trace information may be susceptible to the same error that caused the original source for the database to be missing or in doubt (e.g., probe trace along the same urban canyon), such that it may not be possible to infer the speed limit from the mean probe trace for the segment(s) in question 34. In this case, provided that the speed limit on the first and second segments 44, 46 are the same and the ratio of the average speed vs. speed limit are the same (or within acceptable tolerance) on the first and second segments 44, 46, then it can be inferred that the speed limit on the segment(s) in question is the average of the speed limit on the first and second segments. In the example of FIG. 9, the "new" attribution A' is determined to be the average of the speed limit attribution values in the first and second segments 44, 46, giving A' a value of 100 km/hr.

Missing or doubtful one-way road direction attribution is found in similar manner as speed limit above. The probe traces across the segments 44, 34, 46 are analyzed to see if they traverse all the segments in the same direction. If so, then the segment(s) in question can be inferred to be a one-way road in the same direction as the first and second segments 44, 46.

Figure 10:
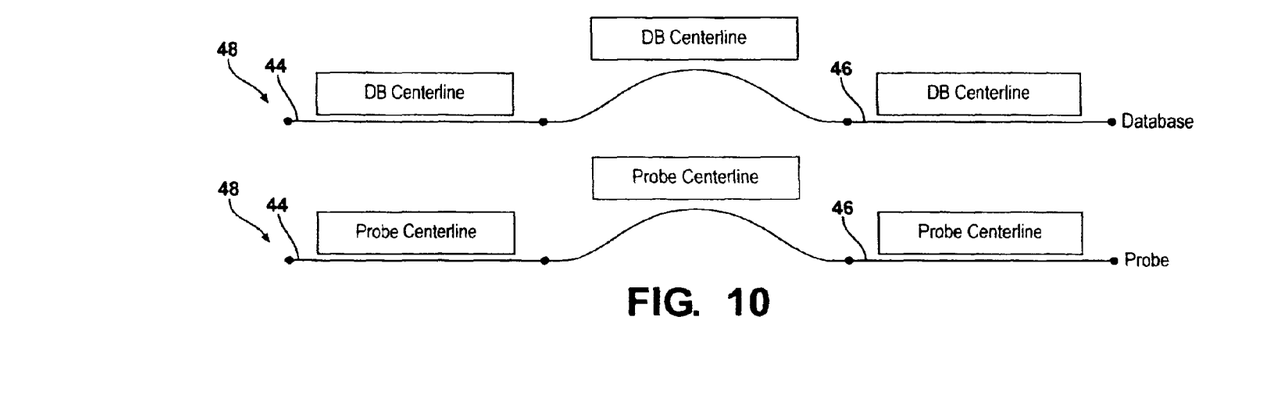
FIG. 10 is a schematic drawing section of another section of the digital transportation network containing database and probe trace information associated with successive segments of the section.

FIG. 10 illustrates verification of centerline attribute on the segment(s) in question 34. The centerline probe trace path along the segments 44, 34, 46 is compared to the original centerline attribute of the database, and if they are equivalent or proportional, then it can be inferred that the centerline attribution of the segment(s) in question 34 is correct.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

What is claimed is:

1. A computer-implemented method of verifying or filling in at least one attribute associated with segments of transportation networks that are digitally mapped from a digital transportation network database, said method comprising:
    identifying, by a processor, an attribute of interest;
    identifying, by the processor, at least one segment in question of the transportation network, wherein the at least one segment in question is present in the database, but is missing the attribute of interest or for which the attribute of interest has unreliable accuracy;
    using, by the processor, the at least one segment in question to identify, in the database, a first segment of the transportation network and a second segment of the transportation network, wherein the first segment is immediately preceding and connected to a front end of the at least one segment in question and the second segment is immediately succeeding and connected to a back end of the at least one segment in question, and further wherein database attribute associated with the first and second segments is determined to be accurate;
    gathering, by the processor, a plurality of probe traces from users of probe-transmitting personal navigation devices that have traversed the at least one segment in question as well as traversed the first and second segments on either side of the at least one segment in question, and determining probe-derived attributes from the probe traces for the at least one segment in question, the first segment and the second segment; and
    determining, by the processor, whether the probe-derived attributes are reliable, and if so, comparing the trend of the probe-derived attributes from the sequence of probe-derived attributes of the first and second segments with the trend of the database attributes from the sequence of database attributes of the first and second segments, and if there is a positive correlation, populating the database attribute of the at least one segment in question using the database attributes of the first and second segments to fill in the missing or verify the unreliable database attribute for the at least one segment in question.

2. The method of claim 1, wherein the gathered probe traces are statistically averaged over the length of the respective segments to derive a mean probe trace associated with each of the first and second segments and the at least one segment in question.

3. The method of claim 2, wherein depending on the characteristics of the attribute of interest, determining either a) the value of the attribute for each segment, or b) the value of an indicator that is functionally related to the attribute of interest.

4. The method of claim 2, wherein the attribute of interest includes anyone of:
    posted speed, average speed, time-of-day based speed zones, roadway centerline location or positional accuracy, one-way traffic indications, stop signs and traffic lights.

5. The method of claim 2, wherein the attribute of interest is average speed, and the statistically averaged mean probe traces provide an average speed attribute that is correlated against the database applied speed attribute to confirm that the database applied speed attribute can be populated thru the gap or given higher confidence in the database.

6. The method of claim 2, wherein the attribute of interest is one of posted speed, time-of-day based speed zone, or one-way indication, and further wherein the statistically averaged mean probe traces provide an average speed value or travel direction value which are indicative of the posted speed, time-of-day based speed zone or oneway indication, or spatial location and determining the proportional function which converts the mean probe trace value to the probe-derived attribute value associated with either posted speed, time-of-day based speed zone, centerline position and shaping or one-way indication, and using correlation to existing database attribute to propagate the attribute on the at least one segment in question to the database.

7. The method of claim 1, wherein if it is determined that the probe-derived attribute information is unreliable across the at least one segment in question, but still determined to be reliable across the first and second segments, and wherein the attribute of interest is posted speed or geometry position and accuracy across the at least one segment in question, then determining further whether the posted speed attributes stored in the database for the first and second segments are substantially the same value within specified limits, and if they are, determining whether the ratios of average speed across the first and second segments derived from the probe trace information versus the posted speed of the first and second segments, respectfully, are substantially that same value within specified limits, then calculating a posted speed attribute for the at least one segment of interest based on the average of the posted speed attributes of the first and second segments.

8. The method according to claim 1 wherein the steps are performed with the assistance of a computer and wherein the data are digital transformations of physical roadway attributes.

9. A computer-implemented method of verifying or filling in at least one attribute associated with segments of a transportation network that are digitally mapped as information of a digital transportation network database, comprising:
   identifying, by a processor, an attribute of interest;
   identifying, by the processor, at least one segment in question of the transportation network, wherein the at least one segment in question is present in the database, but is missing the attribute of interest or for which the attribute of interest has unreliable accuracy;
   using, by the processor, the at least one segment in question to identify, in the database, a first segment immediately preceding the at least one segment in question and whose database attribute is deemed reliable and a second segment immediately succeeding the at least one segment in question and whose database attribute is deemed reliable, and wherein the first and second segments and the at least one segment in question are all part of an extended section of a common transportation network;
   reporting, by the processor, data from a plurality of probe transmitters tracking across both of the first and second road segments and also across the at least one segment in question, the reported data including attribute information;
   comparing, by the processor, the probe-derived attribute of the first and second road segments with the attributes stored in the database for the first and second segments and if there is a positive correlation; and
   updating the database by assigning the probe-derived attribute to the database for the at least one segment in question.

10. The method according to claim 1 further comprising portraying at least a portion of the digital map using the updated database on a display.

11. The method according to claim 9 further comprising portraying at least a portion of the digital map using the updated database on a display.

12. A computer-readable medium which stores a set of instructions which when executed performs a method of verifying or filling in at least one attribute associated with segments of a transportation network that are digitally mapped as information of a digital transportation network database, the method executed by the set of instructions comprising:
   identifying an attribute of interest;
   identifying at least one segment in question of the transportation network, wherein the at least one segment in question is present in the database, but is missing the attribute of interest or for which the attribute of interest has unreliable accuracy;
   using the at least one segment in question to identify, in the database, a first segment immediately preceding the at least one segment in question and whose database attribute is deemed reliable and a second segment immediately succeeding the at least one segment in question and whose database attribute is deemed reliable, and wherein the first and second segments and the at least one segment in question are all part of an extended section of a common transportation network;
   reporting data from a plurality of probe transmitters tracking across both of the first and second road segments and also across the at least one segment in question, the reported data including attribute information;
   comparing the probe-derived attribute of the first and second road segments with the attributes stored in the database for the first and second segments and if there is a positive correlation; and
   updating the database by assigning the probe-derived attribute to the database for the at least one segment in question.

* * * * *